US006263894B1

(12) United States Patent
LaMantia

(10) Patent No.: US 6,263,894 B1
(45) Date of Patent: Jul. 24, 2001

(54) INSECT NET ASSEMBLY

(76) Inventor: Mark LaMantia, 290 Broadway, Methuen, MA (US) 01844

( * ) Notice: Subject to any disclaimer, the term of this patent is extended or adjusted under 35 U.S.C. 154(b) by 0 days.

(21) Appl. No.: 09/329,123

(22) Filed: Jun. 9, 1999

(51) Int. Cl.[7] ............................ E04H 15/02; A47C 29/00
(52) U.S. Cl. ............................ 135/96; 135/117; 135/913; 5/97; 5/416; 296/77.1; 297/184.13; 297/184.14
(58) Field of Search .................. 135/87, 95, 96, 135/137, 115, 117, 913, 97; 296/77.1; 5/97, 93.1, 99.1, 98.1, 414, 416; 297/184.1, 184.13, 184.14

(56) References Cited

U.S. PATENT DOCUMENTS

| | | | |
|---|---|---|---|
| D. 284,057 | * | 6/1986 | Wise ........................................ D6/611 |
| 1,209,479 | * | 12/1916 | Dec'D ................................... 5/121 X |
| 1,897,525 | * | 2/1933 | McGill ............................ 297/184.14 |
| 2,129,080 | * | 9/1938 | Bramnick ....................... 135/88.02 X |
| 2,648,565 | * | 8/1953 | Kennedy et al. ........................... 5/416 |
| 2,789,863 | * | 4/1957 | Shimabukuro ................... 296/77.1 X |
| 2,820,468 | * | 1/1958 | Park et al. ............................. 135/96 |
| 2,881,778 | * | 4/1959 | Goldman ............................ 135/115 X |
| 4,015,297 | * | 4/1977 | Christian ...................................... 5/97 |
| 4,073,017 | * | 2/1978 | Stevens ......................................... 5/97 |
| 4,359,792 | | 11/1982 | Dale . |
| 4,590,956 | | 5/1986 | Griesenbeck . |
| 4,790,340 | | 12/1988 | Mahoney . |
| 5,099,866 | | 3/1992 | Solis et al. . |
| 5,171,059 | | 12/1992 | Patrick . |
| 5,184,865 | | 2/1993 | Mohtasham et al. . |
| 5,259,408 | | 11/1993 | Guerin . |
| 5,494,066 | | 2/1996 | McMahan . |
| 5,711,743 | | 1/1998 | Nichols, Jr. et al. . |
| 5,862,548 | * | 1/1999 | Gerhart ..................................... 5/93.1 |

* cited by examiner

*Primary Examiner*—Carl D. Friedman
*Assistant Examiner*—Winnie Yip
(74) *Attorney, Agent, or Firm*—Wolf, Greenfield & Sacks, P.C.

(57) ABSTRACT

A protective cover against insects for babies' and toddlers' enclosures such as cribs, playpens, strollers and the like includes an unstructured tubular body portion and an unstructured dome-shaped hood, both made of insect netting material which "breathes" and is transparent. The tubular body at its upper edge and the hood at its periphery each have a stretchable band or fastener that reduces the effective dimensions of the body edge and hood periphery so that the body may be drawn downwardly over the enclosure and be held in place by the reduced dimension of the edge and the hood is drawn downwardly over the top of the enclosure and its periphery overlaps the top edge of the body portion.

17 Claims, 11 Drawing Sheets

INSECT NET ASSEMBLY

This invention relates to protective coverings for babies' and toddlers' enclosures, such as cribs, playpens, carriages and the like, and more particularly comprises an unstructured two-piece cover made of insect netting for completely covering such enclosures.

The principal object of the present invention is to provide inexpensive and convenient cover for protecting babies and toddlers while in their cribs, playpens, carriages, or the like from insects.

Another object of the present invention is to provide a protective cover against insects for use on babies' and toddlers' enclosures, which fits a wide variety of enclosure sizes and shapes.

Another object of the present invention is to provide a protective covering against insects for use on babies' and toddlers' enclosures which may very quickly and easily be installed on and removed from such enclosures.

Another important object of the present invention is to provide a protective covering against insects for use on a baby's or toddler's enclosure and which may be stored in a very small space.

To accomplish these and other objects, the protective covering which comprises the present invention is composed of two unstructured pieces of netting, one of which is generally an endless loop or sleeve of netting, open at both ends, and the other a dome-shaped hood. The two pieces are free of rigid braces, stays, and other such frame-like devices so that the two parts may be folded or simply bunched up in a compact ball to occupy minimum space when not in use. The loop portion of the covering in its preferred form has a stretchable band, sewn or otherwise secured to the edge at one open end, and the unexpanded length of the band is substantially less than the circumference of the loop so that when it is slipped over a playpen or crib, the end carrying the stretchable band is gathered so as not to allow the entire loop to be drawn over and fall from the baby's or toddler's enclosure. Rather, the end of the loop carrying the stretchable band engages and remains on the top of the enclosure while the remainder of the netting of the loop hangs down about and covers the sides of the enclosure. The second portion or hood of the protective covering is dome-shaped and its circumferential edge is substantially the same length as the circumference of the loop. The circumferential edge of the dome, like one edge of the loop in the preferred form of the invention, carries a stretchable band whose unexpanded length is substantially the same as the band in the end of the loop. Either before or after the cylindrical portion of the covering is installed over the child's enclosure, the hood may be slipped over the top of the enclosure and the stretchable band will engage the sides thereof so as to hold the hood in place. The edges of the hood and loop when both are installed should overlap one another so as to completely cover the enclosure.

Both the hood and the loop are made of an insect netting material which is either a woven fabric material or an extruded plastic material having openings sufficiently small so as to exclude virtually all insects from passing through it but which are large enough to permit the free flow of air in and out of the enclosure and so as not to obstruct visibility in and out of the enclosure. The configuration of the dome-shaped hood allows the covering to be used with cribs and playpens with or without a canopy.

These and other objects and features of the invention will be better understood and appreciated from the following detailed description of several embodiments thereof, selected for purposes of illustration and shown in the accompanying drawings.

BRIEF FIGURE DESCRIPTIONS

Figure 1:
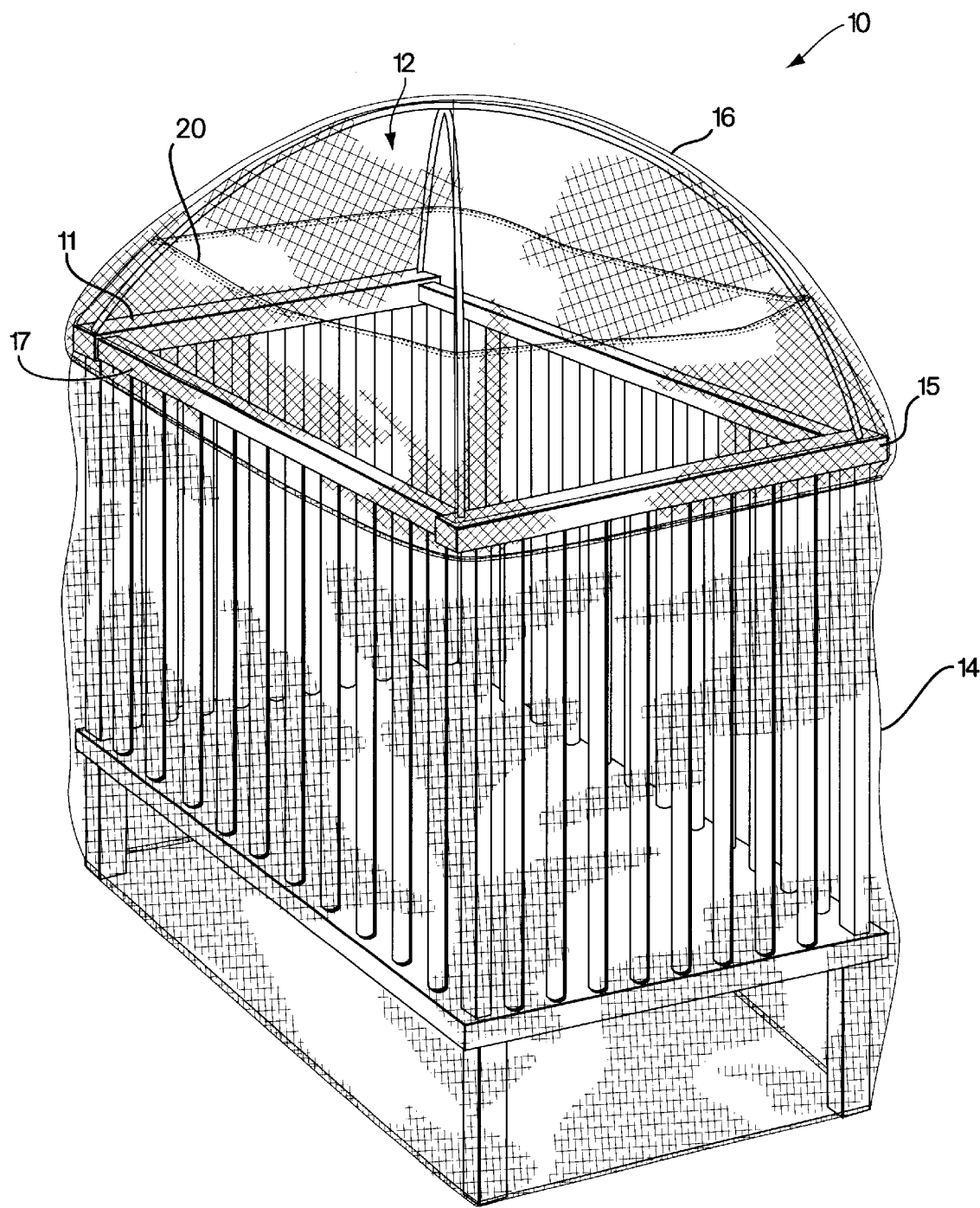
FIG. 1 is a perspective view showing a crib with a canopy enclosed with the protective covering of the present invention.
Figure 1A:
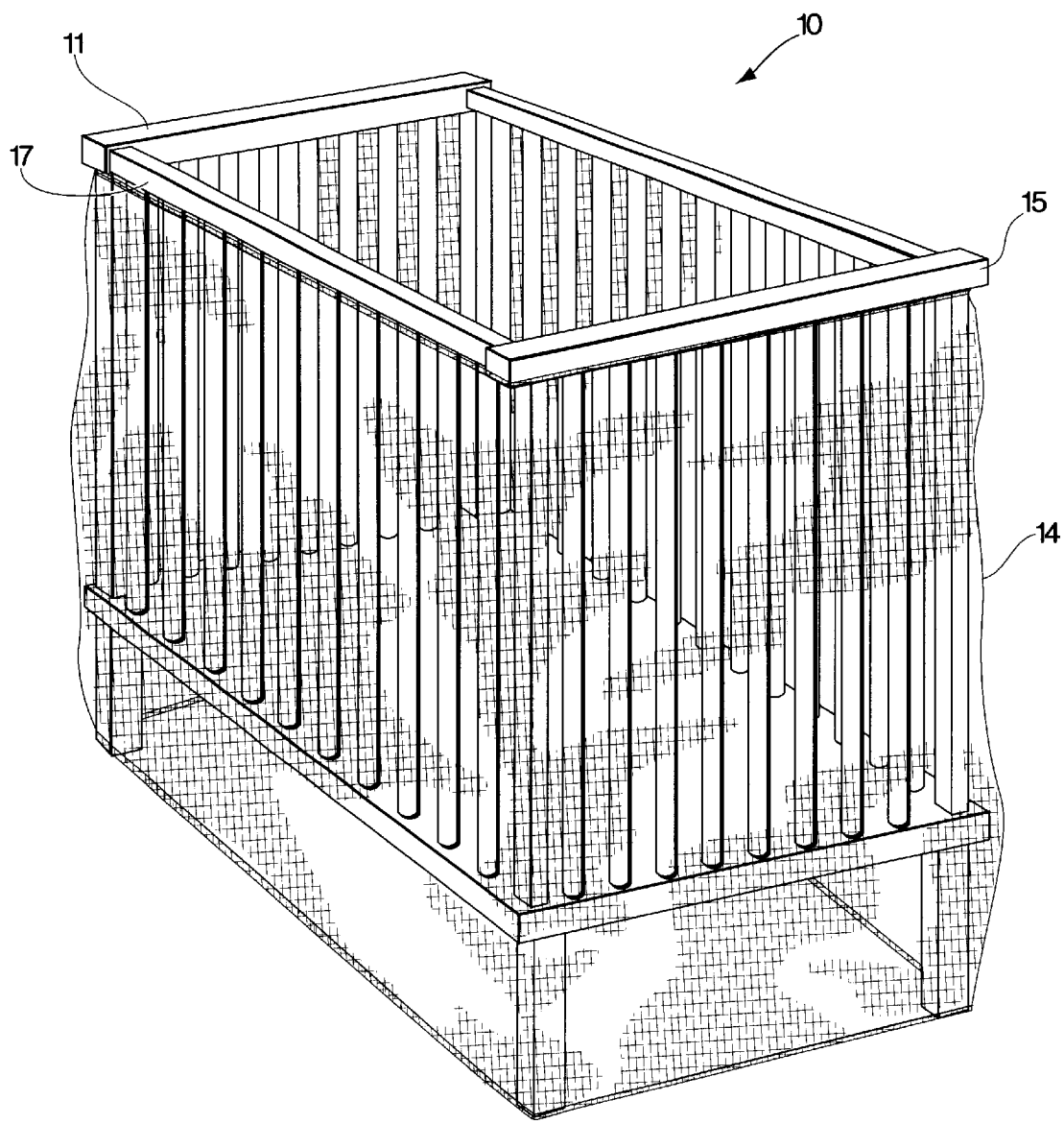
Figure 6:
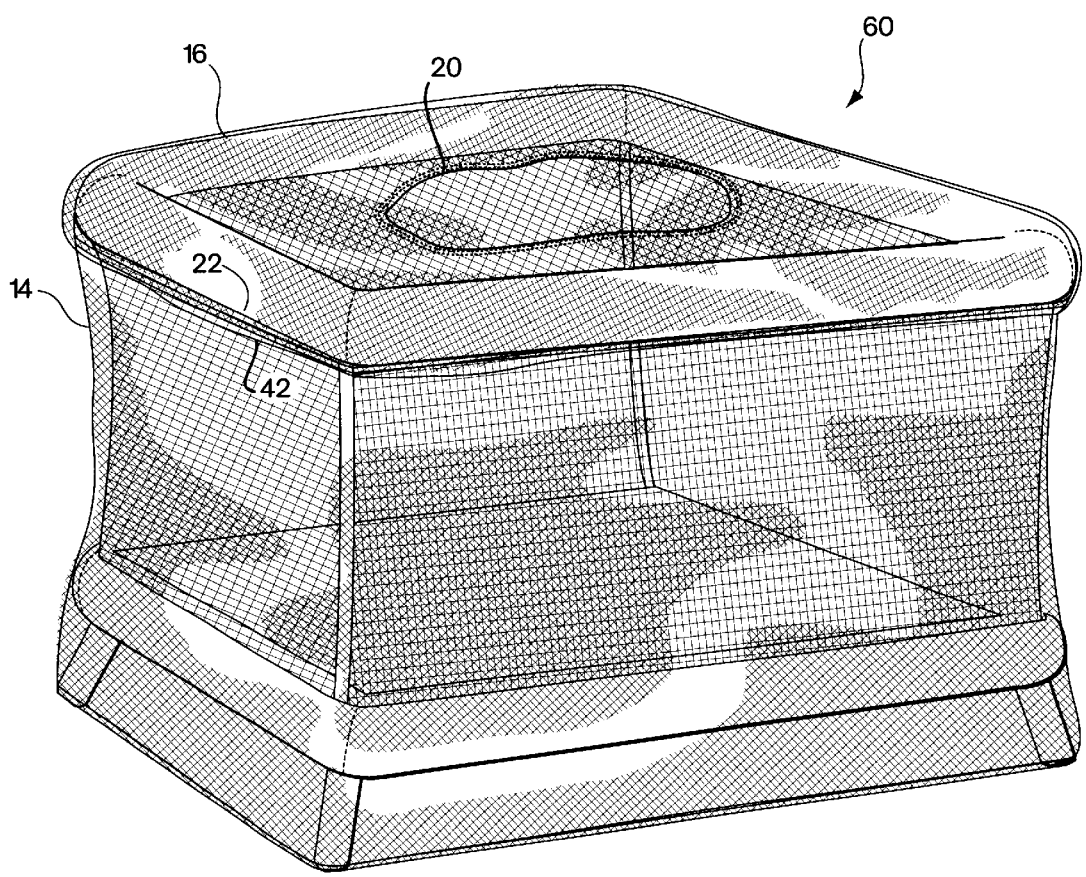
FIG. 6 is a perspective view of the protective covering of this invention applied to a playpen without a canopy.
Figure 7:
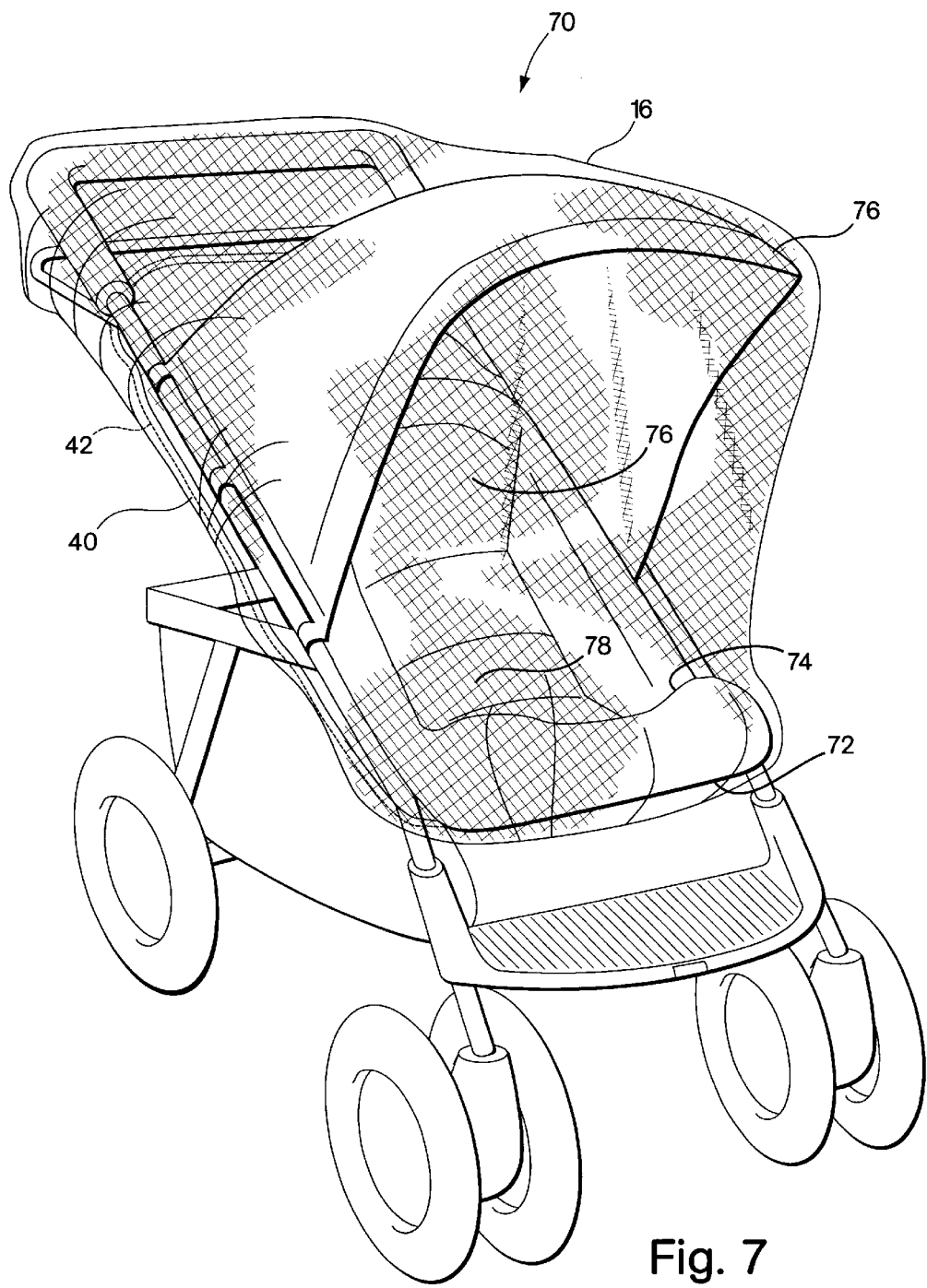
FIG. 7 is a perspective view showing the manner in which the hood portion of the protective covering may be used alone on a stroller.
Figure 8A:
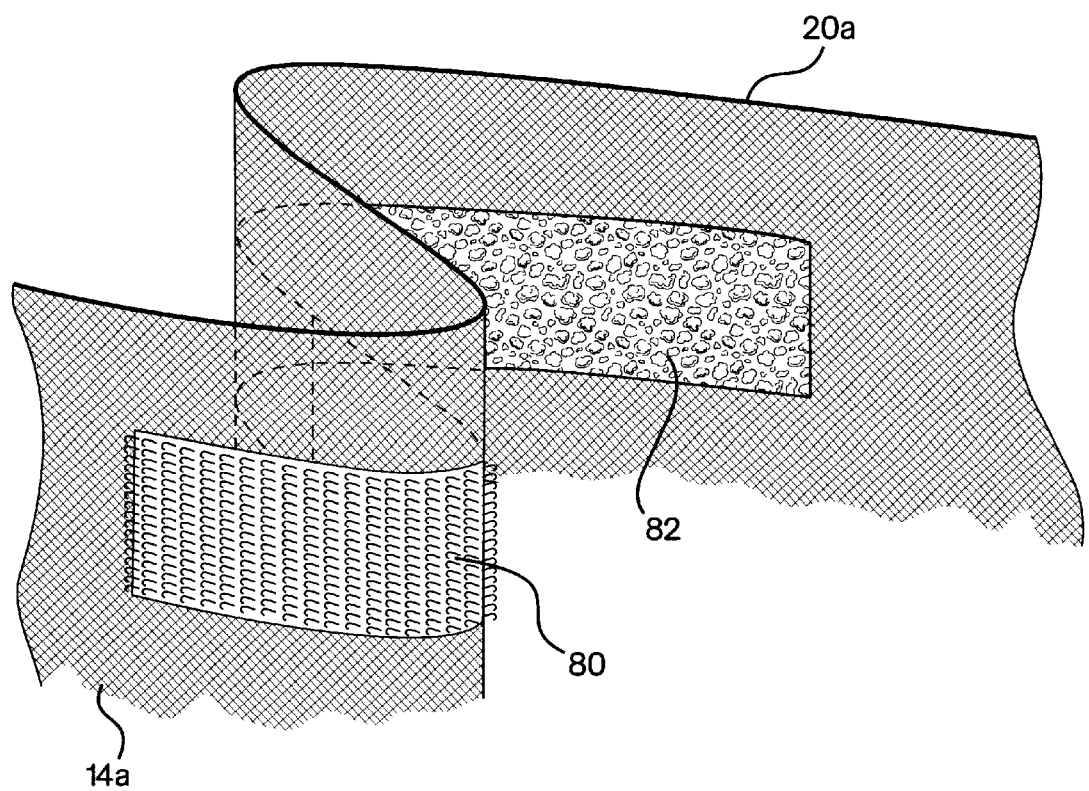
Figure 8B:
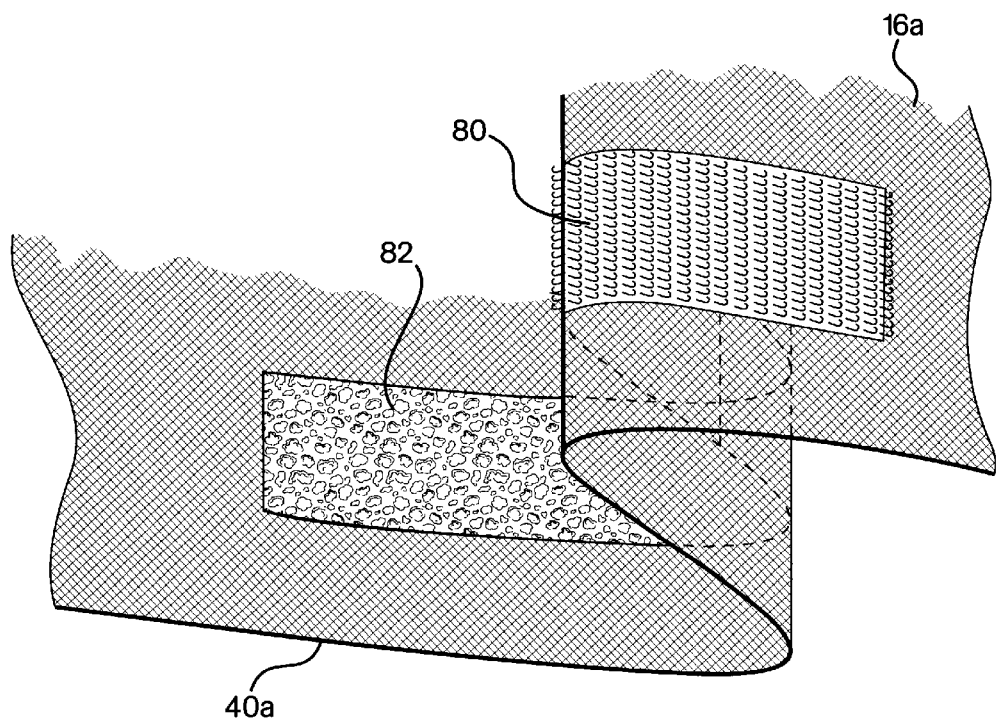
Figure 9:
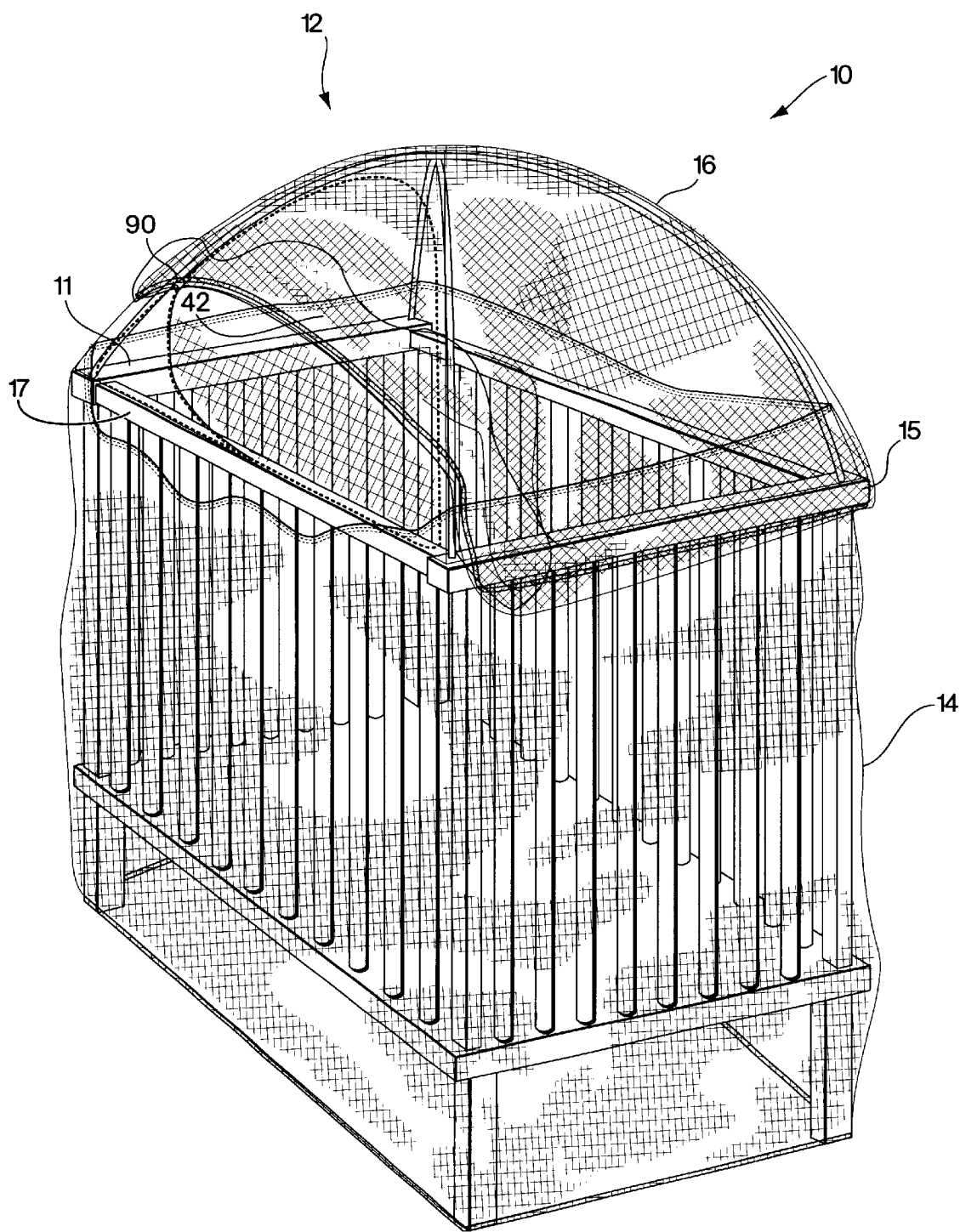

FIG. 8A–FIG. 8B are a fragmentary views of a second embodiment of the protective covering showing the use of Velcro-type hook and loop fasteners to constrict the effective circumference of the hood and the body portion of the covering, used in place of the stretchable bands shown in the preferred embodiment of FIGS. 1–7; and FIG. 9 is a view similar to FIG. 1 but showing the hood partially opened to provide access to the interior of the crib.

DETAILED DESCRIPTION

In FIG. 1, a baby's crib 10 is shown having a canopy 12. The crib 10 includes a headboard 11, footboard 15 and side rails 17 and is typical of babies' cribs widely used today, and the canopy 12 may typically be like that shown in applicant's prior U.S. Pat. No. 4,945,584 dated Aug. 7, 1990. Canopies 12 like that shown in FIG. 1 are commonly used in combination with both cribs and playpens and the protective covering of this invention is particularly suitable for use with such baby's and toddler's enclosures having canopies. However, it should be appreciated that the present invention may be used on cribs and playpens as well as other types of enclosures that do not have canopies. Neither the crib 10 nor the canopy 12 forms part of the present invention. Rather, the invention is directed to the covering for such cribs, playpens and the like and the use thereof with such enclosures.

Figure 2:
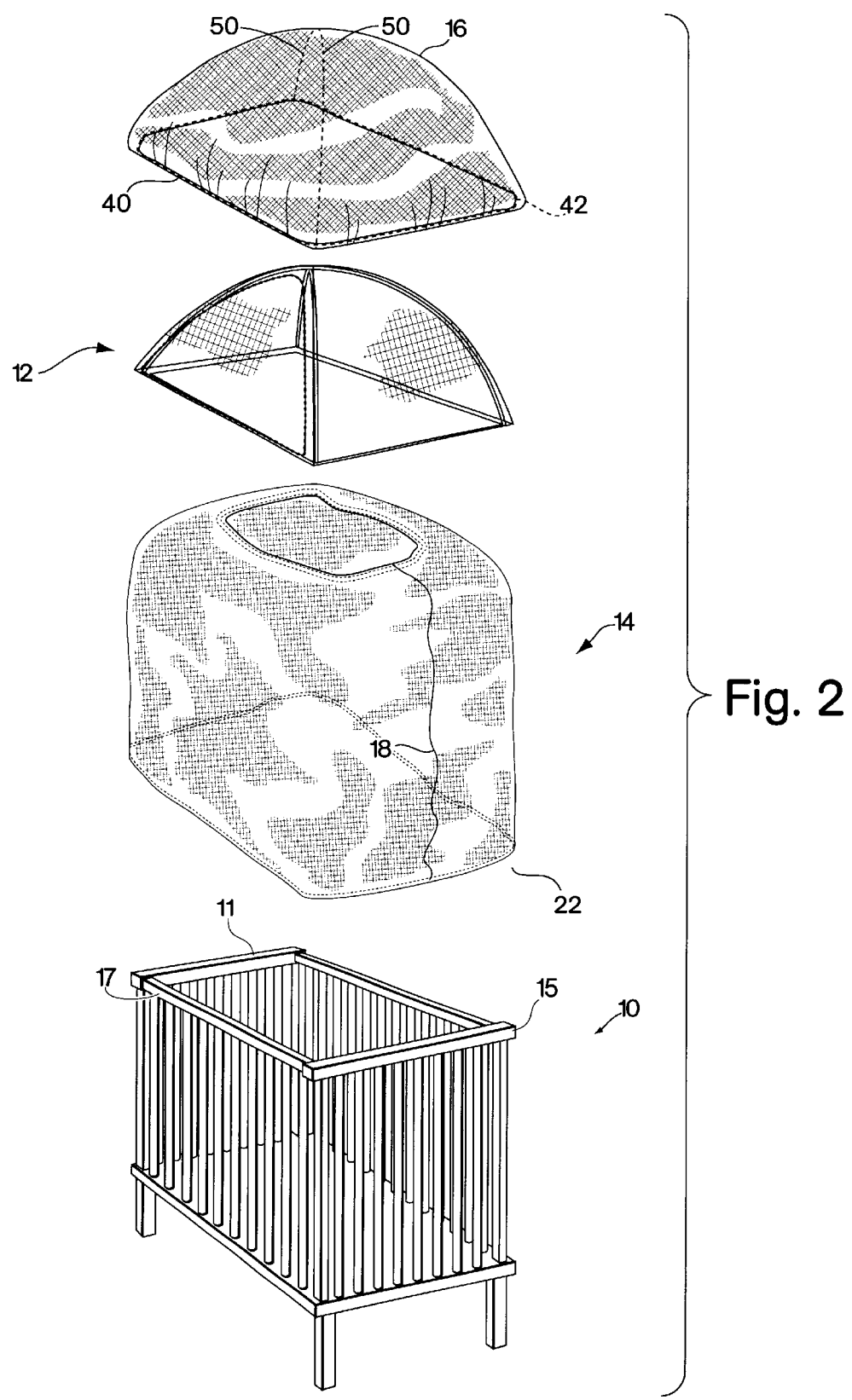
FIG. 2 is an exploded perspective view showing the two portions of the protective covering in the general shape assumed when in use with the crib and canopy of FIG. 1.
Figure 3:
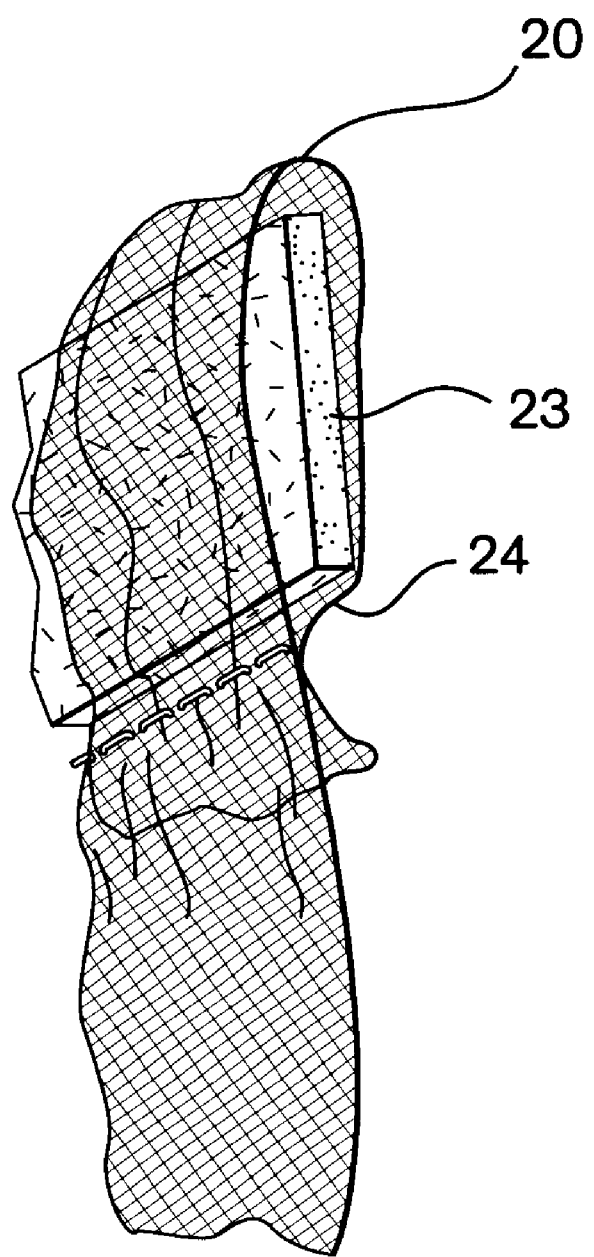
FIG. 3 is a cross-sectional view of the upper edge of the loop portion of the covering showing a stretchable band incorporated into the edge thereof.

The preferred embodiment of protective covering of the present invention is shown in FIG. 2. It comprises a body portion 14 and a hood 16. The body portion 14 and the hood 16 are each made of an insect netting material, typically a woven material having 12–32 openings per square inch, which allows the fabric material to breathe but does not permit insects to pass through it. The body portion 14 is in the form of an endless loop or cylinder, typically approximately 46 inches in height with a circumference between 150 and 225 inches, and preferably 185 inches in circumference. In FIG. 2, a seam 18 is suggested where the ends of a rectangular sheet of the netting material are stitched or otherwise secured together to form the endless loop. The body portion 14 has top and bottom edges 20 and 22 when oriented with its axis essentially vertical. The edge 22 of the body portion 14 may be hemmed or otherwise finished off typically with a binding strip 22a as suggested. In the preferred form, the upper edge 20 of the body portion 14 shown in FIG. 3 carries a stretchable band 23 enclosed within the hemmed margin 24 at the upper edge 20. The stretchable band 23 may be incorporated in other ways into the loop. For example, the band itself may have finished edges and may be stitched to the edge 20 of the fabric netting that comprises the loop, or it may simply be threaded through the openings in the netting material. Preferably, the stretchable band 23 has an unextended length of approximately half circumferential length of the loop and preferably approximately 90 inches, which causes the upper end of the body portion 14 to gather and thereby reduce the size of the opening at the upper end when the stretchable band is unexpanded to approximately one-quarter the cross-sectional area of the loop when placed in a circular cylindrical shape. When the body portion 14 is drawn over the crib, the constricted edge 20 of the cylinder may bear tightly against the canopy 12 somewhat above the lower edge thereof or the top of the crib headboard 11 and footboard 15 respectively as well as the side rails 17 when they are in the raised position, so as to support the loop portion 14 of the covering as a skirt about the sides of the crib. Preferably the bottom 22 of the cylinder will extend to the floor, as shown in FIG. 1.

The hood 16 preferably is dome-shaped and has a circumference at its lower edge 40 substantially equal to the circumference of the body portion 14, preferably approximately 185 inches. The height of the dome measured at the center preferably is approximately 33 inches. A stretchable band 42, like the stretchable band 23 in the body portion 14, is incorporated into the edge 40 in the same fashion as that band. The dome configuration of the hood 16 may typically be achieved by sewing triangular strips of netting material together as suggested by the seams 50 in FIG. 2 or by any other technique. The dome-shape of the hood 16 is particularly advantageous in securing it to a crib or playpen having a canopy as suggested in FIGS. 1 and 5 or to a stroller as shown in FIG. 7.

In applying the covering to a crib with a canopy as shown in FIG. 1, the user may very easily slip the bottom edge 22 of the body portion 14 over the top of the canopy 13 and draw that edge toward the floor. Ultimately the top edge 20 carrying the expandable band 23 will be stretched by the perimeter of the canopy 13 which exceeds the unstretched length of the band at the top edge 20 and will hang tightly at that height on the canopy with sufficient tension being exerted by the band against the canopy to hold the body portion 14 in place as suggested in FIG. 1. A portion of the top edge 20 may alternatively engage the headboard 11 and/or footboard 15 and/or rails 17 depending upon the circumferential dimension of the crib and the stretchability of the band 23. When the constricted upper edge 20 of the body portion hangs securely on the crib and/or canopy, the bottom edge 22 of the body portion 14 should be pulled down about the rails 17 and headboard 11 and footboard 15 to the floor. Next, the hood 16 is slipped over the canopy 12 which is very easily accomplished because the shape of the hood generally corresponds to that of the canopy. The stretchable band 42 on the edge 40 should be expanded so that it extends below, that is, overlaps the top edge 20 of the body portion 14 of the covering and about the top of the headboard and footboard as shown in FIG. 1. The band 42 will retain the hood in place on the crib-canopy combination, and the overlapping relationship of the hood 16 and body portion 14 will prevent insects from entering the crib.

Figure 4:
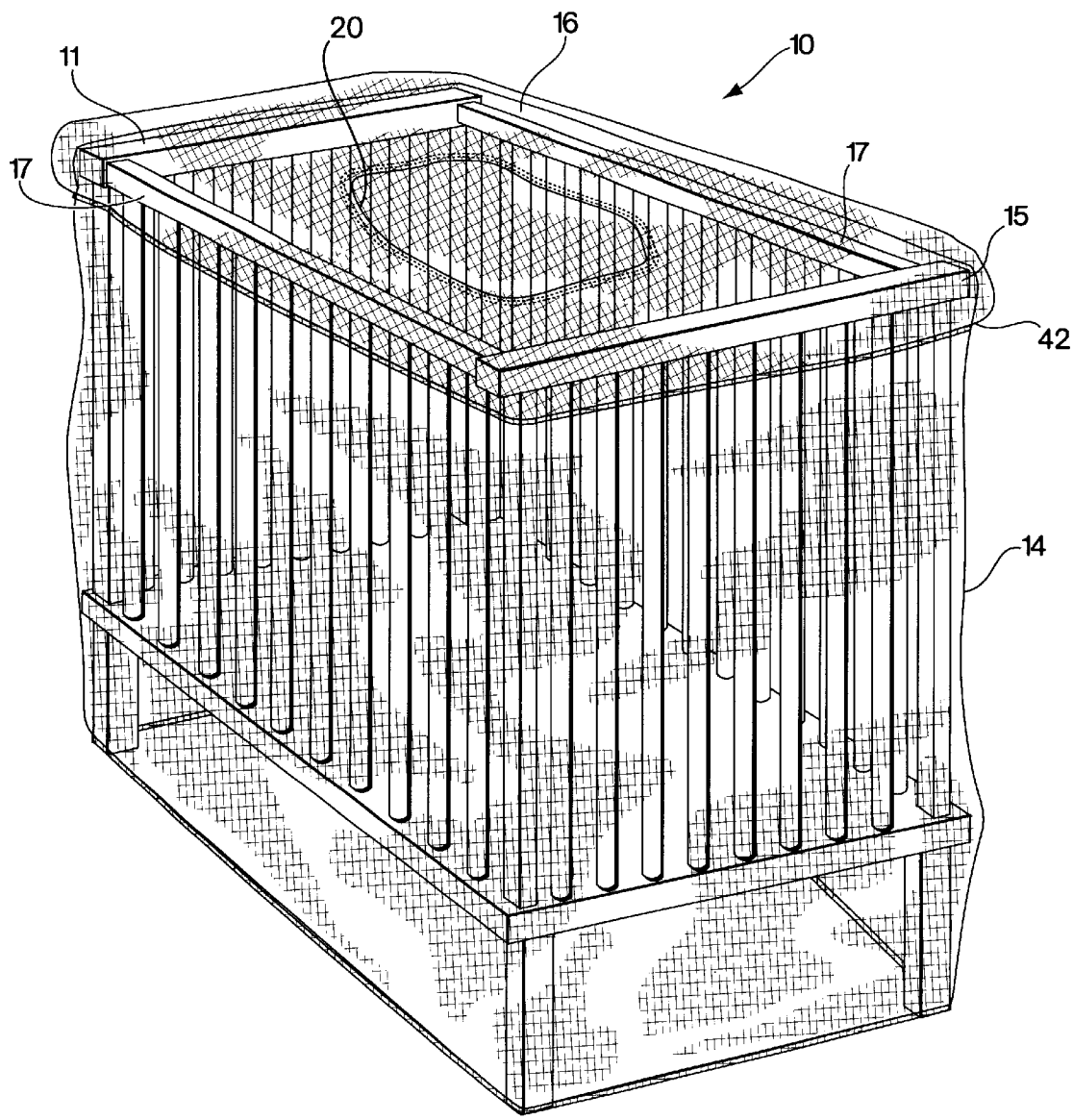
FIG. 4 is a perspective view of the protective covering of this invention applied to a crib without a canopy.

In FIG. 4 body portion 14 and hood 16 are shown applied to a crib without a canopy. This application is particularly useful when the baby is too young to stand in the crib so that its head does not extend above the height of the side rails 17, headboard 11 or footboard 15. The loop or body portion 14 is applied to the crib in the same manner as described above in connection with the crib and canopy, but its stretchable band 23 normally will not pass below the top of the headboard 11 and footboard 15 of the crib but rather will constrict the top edge 20 of the body portion to a smaller opening than the periphery of the crib as shown in FIG. 4. Next the hood 16 is slipped over the top of the crib with its stretchable band 42 engaging the headboard 11, footboard 15 and rails 17 below the edge 20 of the body portion 14 so as to completely enclose the crib. Note that the bottom edge 22 of the loop rests on the floor.

Figure 5:
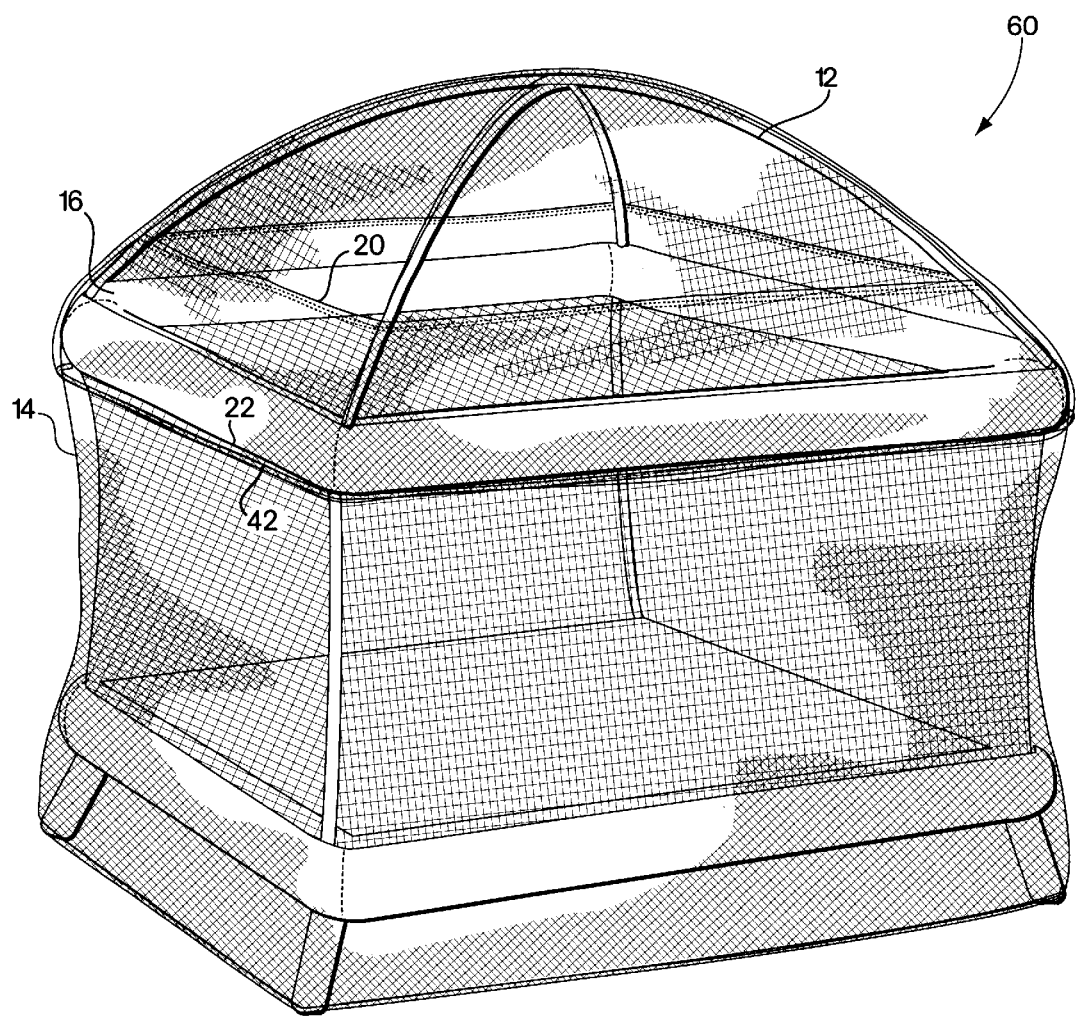
FIG. 5 is a perspective view of the protective covering of this invention applied to a playpen with a canopy.

In FIGS. 5 and 6 the covering is shown applied to a playpen 60 with and without a canopy. The covering is applied to the playpen 60 in FIGS. 5 and 6 in the same manner it is applied to the crib 10 with and without the canopy as shown in FIGS. 1 and 4. It should be noted that in each application, the lower edge 40 and stretchable band 42 of the hood 16 are disposed below the top edge 20 and band 23 of the body portion 14 so that insects cannot gain access to the interior of the playpen.

In FIG. 7 the hood 16 without the body portion 14 is shown applied to a stroller 70 to protect the child from insects. In this use of the covering, the stretchable band 42 about the edge 40 of the hood 16 is simply pulled down below the edge 72 of stroller baby support 74 so as to completely enclose the backrest 76 and seat 78 as well as the awning 79 (if the stroller 70 includes one) together with the child in the stroller. The unstructured form of the hood allows it to be used with a very wide variety of sizes and shapes of strollers.

In FIGS. 8A–8B a second embodiment of this invention is suggested. In this embodiment the expandable bands 23 and 42 are replaced with several Velcro-type hook and loop fastener strips 80, 82 spaced about the upper end of the body portion 14a adjacent the edge 20a so that the effective length of the upper edge may be reduced sufficiently so that the edge 20a will not pull down over the top of the crib or playpen (or their canopies when used) but rather will hang at the top of the crib or playpen, and the body fabric will drape about the sides of the enclosure with its lower edge falling to the floor, just as in the embodiment of FIGS. 1–6. Similarly, the edge 40a of the hood 16a carries hook and loop Velcro fastener strips 80, 82 spaced about that edge so that edge 40a may be gathered to effectively reduce its diameter. After the hood 16a is placed in position over the canopy or top of the crib or playpen and the edge 40a is disposed below the top edge 20a of the body, the strips 80, 82 may be attached to one another so as to close the edge 20a tightly about the body portion so as to preclude access by insects to the interior or the enclosure. The same system may be employed to attach the hood 16a to a stroller.

From the foregoing it will be appreciated that the covering may very easily and quickly be applied to any of the commonly used enclosures for toddlers and babies. When installed in place, access to the interior of the enclosure may quickly be gained simply by stretching the band 42 or opening some of the fasteners 80, 82 at the lower edge of the hood and lifting or folding back a portion of the hood as suggest in FIG. 9. With the hood partially removed as suggested, the canopy may readily be opened by means of the zipper 90 or whatever type of closure provided in the canopy. If necessary, the top edge 20 of the body portion 14 may also be stretched and pulled down over the top edge of the enclosure. In this way, the child may be removed from the enclosure and access is gained to the interior of the enclosure for any purpose. The same procedure is followed whether or not a canopy is employed for direct access to the interior of the enclosure.

Having described this invention in detail, those skilled in the art will appreciate that numerous modifications may be made of the invention without departing from its spirit. Therefore, it is not intended that the breadth of the invention be limited to the specific embodiments illustrated and described. Rather, the breadth of the invention is to be determined by the appended claims and their equivalents.

What is claimed is:

1. A protective cover against insects for babies' and toddlers' enclosures such as cribs, playpens, and strollers comprising an unstructured looped sheet of netting for encircling the sides of the enclosure, said netting having top and bottom edges, a stretchable band attached to the sheet of netting adjacent the top edge only thereof and having an unexpanded length substantially less than the length of the top edge of the sheet for shortening the effective length of the top edge of the looped sheet to make it smaller than the circumferential length of the enclosure and the bottom edge being adapted to extend to cover the bottom of the enclosure for permitting the sheet to hand loosely down the sides of the enclosure, an unstructured dome-shaped hood separate from the looped sheet and made of netting material for covering the top of the enclosure and overlapping the top edge of the looped sheet, said hood having a bottom edge approximately the same length as the top edge of the looped sheet, and a stretchable band attached to the hood adjacent the bottom edge of the hood and having an unexpanded length approximately the same as the unexpanded length of the band attached.

2. A protective cover as defined in claim 1 wherein the looped sheet has a circumference in the range of 150 to 225 inches.

3. A protective cover as defined in claim 1 wherein the unexpanded length of the elastic band in the looped sheet is approximately half the length of the sheet.

4. A protective cover as defined in claim 2 wherein the unexpanded length of the elastic band in the looped sheet is approximately half the length of the sheet.

5. A protective cover against insects for babies' and toddlers' enclosures such as cribs, playpens, and strollers comprising an unstructured sheet of insect netting material for encircling the sides of the enclosures and having top and bottom edges, means attached to the sheet adjacent its top edge for shortening the effective length of the top edge of the sheet to make it smaller than the circumferential length of the enclosure so that the sheet may extend over the sides of the top of the enclosure and drape from the top of the enclosure and cover the sides of the enclosure, an unstructured hood separate from the sheet and made of netting material for covering the top of the enclosure, said hood having a lower edge, and means attached to the hood adjacent its lower edge for gathering the material of the hood for enabling the hood to closely encircle the sides of the enclosure in overlapping relationship with the top edge of the sheet.

6. A protective cover as described in claim 5 wherein the sheet is formed in an endless loop.

7. A protective cover as described in claim 5 wherein the means attached to the sheet and the hood are the same.

8. A protective cover as described in claim 7 wherein the means are stretchable bands attached to the sheet and hood.

9. A protective cover as described in claim 5 wherein one of the means includes hook and loop fasteners.

10. A protective cover as described in claim 5 wherein both of the means include hook and loop fasteners.

11. A protective cover as described in claim 6 wherein one of the means is hook and loop fasteners.

12. A protective cover as described in claim 6 wherein both of the means are hook and loop fasteners.

13. A protective cover as described in claim 5 wherein the means attached to the sheet is a stretchable band attached to the top edge of said sheet.

14. A protective cover as described in claim 5 wherein the means attached to the hood is a stretchable band.

15. A protective cover as defined in claim 5 wherein the sheet has a length in the range of 150 to 225 inches.

16. A protective cover as defined in claim 13 wherein the unexpanded length of the band is approximately half the length of the sheet.

17. A protective cover as described in claim 15 wherein the means attached to the hood is a stretchable band.

* * * * *

UNITED STATES PATENT AND TRADEMARK OFFICE
CERTIFICATE OF CORRECTION

PATENT NO. : 6,263,894 B1
DATED : July 24, 2001
INVENTOR(S) : Mark LaMantia

It is certified that error appears in the above-identified patent and that said Letters Patent is hereby corrected as shown below:

Column 5,
Line 27, should read -- enclosure for permitting the sheet to hang loosely down --
Line 38, should read -- length of the band attached the looped sheet, whereby the bottom edge of the hood being shortened for enabling the hood to overlap and engage with the looped to cover the top of the enclosure. --

Signed and Sealed this

Twelfth Day of April, 2005

JON W. DUDAS
*Director of the United States Patent and Trademark Office*

UNITED STATES PATENT AND TRADEMARK OFFICE
CERTIFICATE OF CORRECTION

PATENT NO.   : 6,263,894 B1
DATED        : July 24, 2001
INVENTOR(S)  : Mark LaMantia It is certified that error appears in the above-identified patent and that said Letters Patent is hereby corrected as shown below:

<u>Column 5,</u>
Line 27, should read -- enclosure for permitting the sheet to hang loosely down --.
Line 38, should read -- length of the band attached to the looped sheet, whereby the bottom edge of the hood being shortened for enabling the hood to overlap and engage with the looped sheet to cover the top of the enclosure. --.

This certificate supersedes Certificate of Correction issued April 12, 2005.

Signed and Sealed this

Twenty-fifth Day of October, 2005

JON W. DUDAS
*Director of the United States Patent and Trademark Office*